(12) United States Patent
Vatin et al.

(10) Patent No.: US 7,607,525 B2
(45) Date of Patent: Oct. 27, 2009

(54) FRICTION DEVICE FOR A CLUTCH, IN PARTICULAR FOR A MOTOR VEHICLE

(75) Inventors: Géraud Vatin, Rilhac Rancon (FR); Philippe Walter, Couzeix (FR)

(73) Assignee: Valeo Materiaux de Friction - Societe Par Actions Simplifiee, Limoges (FR)

( * ) Notice: Subject to any disclaimer, the term of this patent is extended or adjusted under 35 U.S.C. 154(b) by 417 days.

(21) Appl. No.: 11/635,347

(22) Filed: Dec. 8, 2006

(65) Prior Publication Data

US 2007/0131515 A1 Jun. 14, 2007

(30) Foreign Application Priority Data

Dec. 13, 2005 (FR) .................................. 05 53856

(51) Int. Cl.
  *F16D 13/64* (2006.01)
  *F16D 69/04* (2006.01)
(52) U.S. Cl. .................. 192/107 C; 192/52.6; 192/200
(58) Field of Classification Search ................ 192/52.6, 192/107 C, 200

See application file for complete search history.

(56) References Cited

U.S. PATENT DOCUMENTS

| 2,646,151 | A | | 7/1953 | Wellman et al. | |
|---|---|---|---|---|---|
| 4,998,608 | A | * | 3/1991 | Raab et al. ............. | 192/213.12 |
| 5,076,409 | A | | 12/1991 | Graton et al. | |
| 5,137,133 | A | * | 8/1992 | Graton et al. ........... | 192/107 C |
| 6,016,899 | A | | 1/2000 | Ament | |

FOREIGN PATENT DOCUMENTS

| FR | 2 420 056 A | | 10/1979 |
|---|---|---|---|
| FR | 2600732 A | * | 12/1987 |
| FR | 2 764 019 A | | 12/1998 |
| GB | 2 341 901 A | | 3/2000 |
| WO | WO 2006/000727 A | | 1/2006 |

* cited by examiner

*Primary Examiner*—Richard M. Lorence
(74) *Attorney, Agent, or Firm*—Berenato, White & Stavish, LLC

(57) ABSTRACT

This device (10) comprises first (24A) and second (24B) friction lining members, substantially annular and coaxial, separated axially and delimited by opposing friction faces. The first friction lining member (24A) comprises a radially external part (32A) comprising a friction lining (26A), a radially internal part (30A) intended to be fixed to the second friction lining member (24B), and elastic connecting tongues (35A) each provided with a first end (36A) for connection to the radially external part (32A) and a second end (38A) for connection to the radially internal part (30A), the first (36A) and second (38A) connecting ends having an angular offset between them that is variable according to the axial separation of the two friction lining members (24A, 24B).

11 Claims, 3 Drawing Sheets

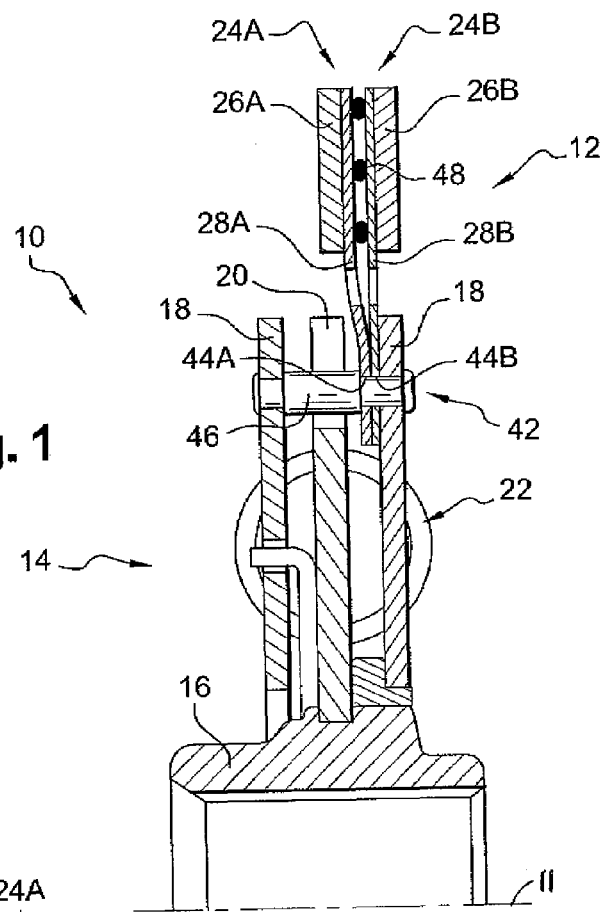
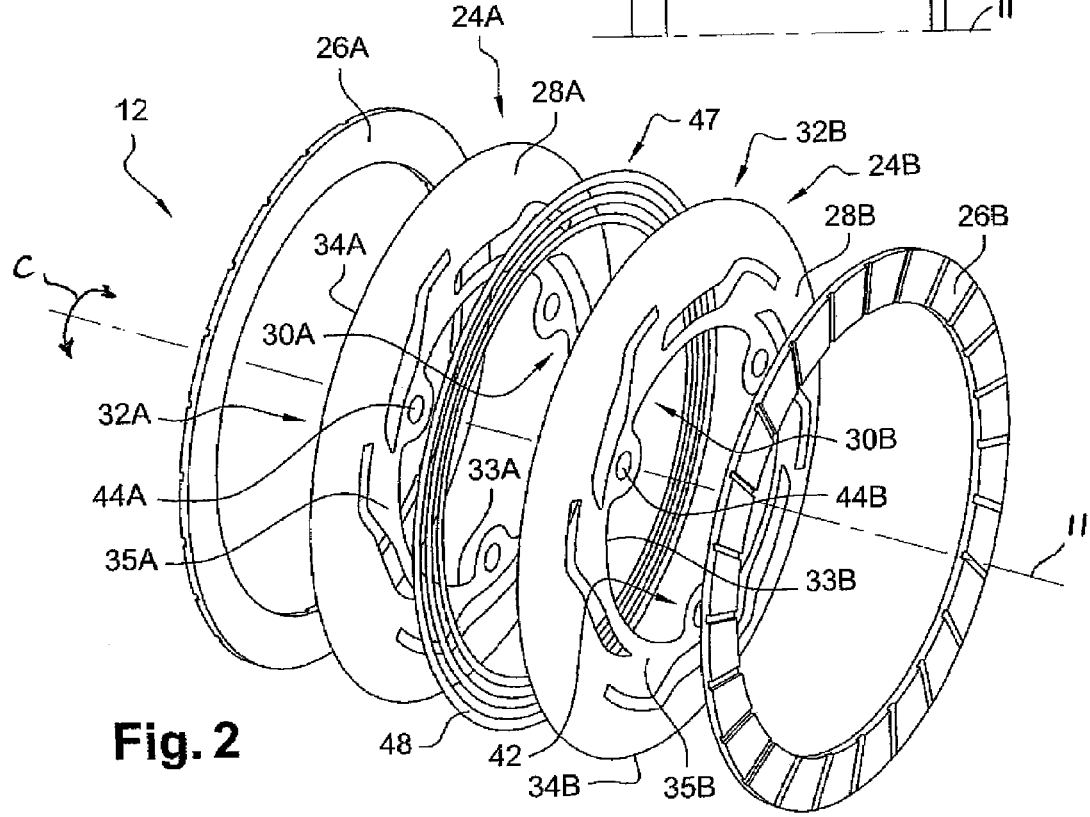

FRICTION DEVICE FOR A CLUTCH, IN PARTICULAR FOR A MOTOR VEHICLE

BACKGROUND OF THE INVENTION

1. Field of the Invention

The present invention concerns an improved friction device for a clutch, in particular for a motor vehicle.

2. Description of the Related Art

A motor vehicle clutch is intended to transmit a torque between an engine flywheel of the motor vehicle and a gearbox input shaft. For this purpose, the clutch comprises a mechanism rotationally fixed to the engine flywheel and a friction device rotationally fixed to the gearbox shaft.

The mechanism comprises a pressure plate and a reaction plate, intended to cooperate with first and second friction linings of the friction device. These friction linings are carried by at least one support, normally generally of revolution in shape.

The friction device must achieve a compromise between various technical constraints.

On the one hand, it is necessary to limit the mass and inertia of the friction device.

For this purpose, it is wished to limit the dimensions of the friction linings, for example the thickness and radial width of these friction linings. It is also wished to avoid the presence of rivets fixing the linings to their support by opting as far as possible for the adhesive bonding of these linings to their support.

On the other hand, it is necessary to be able to actuate the clutch progressively.

For this purpose, it is wished to incorporate elastic means, in general an elastomer mass, in the friction device, in order to ensure this progressiveness.

Shearing effects limit the possibilities of arranging the elastomer mass between a lining and its support.

There has therefore been proposed in the prior art, in particular in EP-A-0 419 329, a friction device for a clutch, in particular for a motor vehicle, of the type comprising first and second friction lining members, substantially annular and coaxial, separated axially and delimited by opposing friction faces.

In a friction device of this type, the friction lining members each comprise a support carrying a friction lining. In this case, the elastomer mass is interposed between the first and second supports.

More particularly, each lining support described in EP-A-0 419 329 comprises a peripheral part annular in shape overall and a central part for connection with the other lining support. The central parts of the supports are contiguous. The peripheral parts of the supports, separated axially from each other, are connected to the central parts by intermediate parts converging from these peripheral parts towards these central parts.

Because of this, when the friction linings are clamped between the pressure and reaction plates, the peripheral parts of the lining supports deform, diverging towards the intermediate parts of the axially relatively rigid supports. Consequently the separation between the peripheral parts of the lining supports does not vary uniformly radially, when the friction linings are clamped between the pressure and reaction plates.

As a result the friction linings do not cooperate uniformly radially with the pressure and reaction plates, which impairs the performance of the clutch.

SUMMARY OF THE INVENTION

The aim of the invention is in particular to propose a friction device provided with friction lining support moving substantially parallel with respect to each other when they are acted on by the pressure and reaction plates.

For this purpose, the invention has as an object a friction device of the aforementioned type, where the first friction lining member comprises:

a radially external part comprising a friction lining,
a radially internal part intended to be connected to the second friction lining member, and
elastic connecting tongues each provided with a first end for connection with radially external part and a second end for connection with the radially internal part, the first and second connecting ends having an angular offset between them variable according to the axial separation of two friction lining members.

The connecting tongues enable the radially external part to move with respect to the second friction lining member substantially by screwing along a rotation axis of the friction lining members (it will be recalled that screwing along an axis is a simultaneous combination of a rotation along this axis and a translation parallel to this same axis).

Thus, when the axial separation between the radial external part and the second friction lining member increases, the angular offset between the connecting ends of each connecting tongue decreases, and when the axial separation between the radially external part and the second friction lining member decreases, the angular offset between the connecting ends of each connecting tongue increases.

By virtue of the connecting tongues, the friction lining members, carried respectively by the radially external part and the second friction lining member, remain substantially parallel to each other when they are acted on by the pressure and reaction plates. Thus the contact of the friction linings with the pressure and reaction plates is optimized.

A friction device according to the invention can also comprise one or more of the following characteristics:

the connecting tongues are folded so that the first and second connecting ends are offset axially from each other;
each connecting tongue is made in one piece with the radially internal and external part;
the friction device comprises means of connecting the radially internal part with the second friction lining member, comprising at least one fixing orifice formed in the radially internal part;
the connecting means comprise at least one connecting orifice formed in the second friction lining member, opposite the orifice formed in the radially internal part, and a connecting rivet passing through the orifices;
the connecting means are also intended to couple the radially internal part with a gearbox input shaft of the motor vehicle;
the friction device comprises elastic means for axial bracing of the first and second friction lining members, intended to ensure the progressiveness of the clutch;
the radially internal part of the first friction lining member extends radially as far as a friction bearing surrounding a hub intended to be coupled to a gearbox input shaft and free to rotate with respect to this hub, so as to participate on one hand in the centering of the first and second supports with respect to the hub and on the other hand in the axial positioning of this bearing by cooperation with a shoulder on this bearing;

the second friction lining member comprises a radially external part, comprising a friction lining, a radially internal part intended to be fixed to the first friction lining member, and elastic connecting tongues each provided with a first end for connection with the radially external part and a second end for connection with the radially internal part, the first and second connecting ends having an angular offset from each other that is variable according to the axial separation of the two friction lining members.

BRIEF DESCRIPTION OF THE DRAWING

The invention will be better understood from a reading of the following description, given solely by way of example and made with reference to the accompanying drawings, in which:

FIG. 1 is a view in axial section of a friction device according to the invention;

FIG. 2 is a exploded view of the friction device of FIG. 1;

DETAILED DESCRIPTION OF THE PREFERRED EMBODIMENTS

Figure 3:
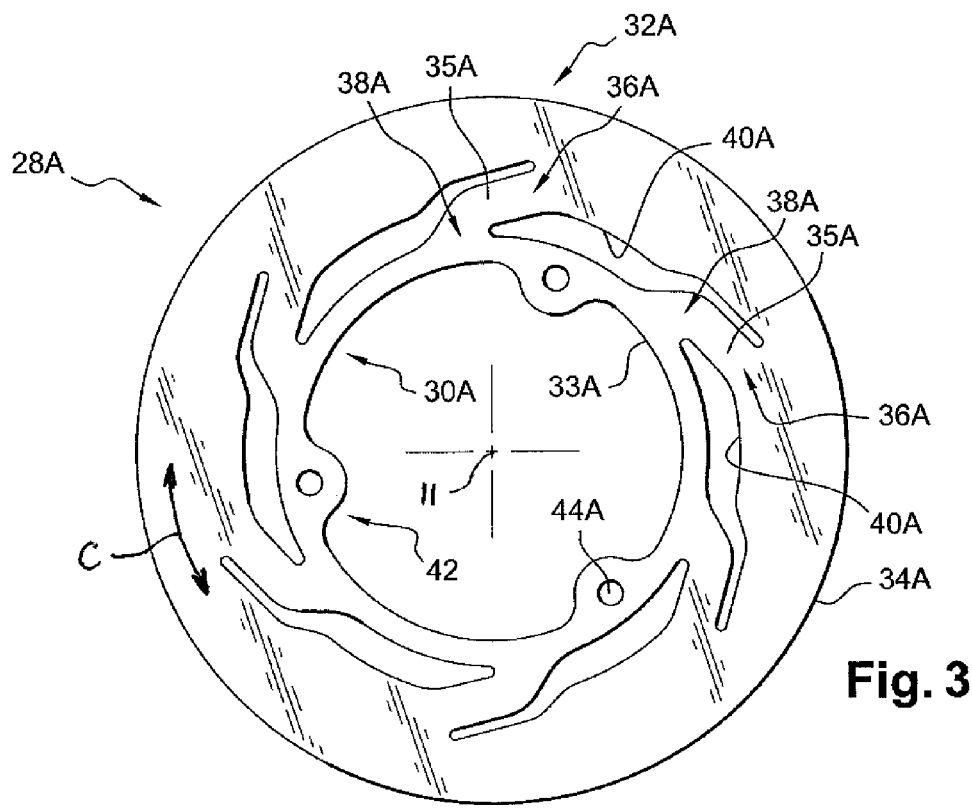
FIG. 3 is a front view of a support of the friction device in FIGS. 1 and 2.

FIG. 1 depicts a friction device 10 for a clutch, in particular for a motor vehicle.

The friction device 10 comprises a friction disc 12 and a damper 14 of a conventional type, intended to transmit a torque between the friction disc 12 and a hub 16 intended to be coupled to a gearbox input shaft of the motor vehicle (not shown).

The damper 14 comprises two guide washers 18 rotationally fixed to the friction disc 12, and a plate 20 rotationally fixed to the hub 16. The damper 14 also comprises elastic means 22 intended to transmit the torque between the guide washers 18 and the plate 20 whilst damping any vibrations.

The friction disc 12, shown in more detail in FIG. 2, comprises first 24A and second 24B friction lining members, substantially annular and coaxial with each other and a rotation axis 11 of the friction disc 12.

The first 24A and second 24B friction lining members comprise respectively first 26A and second 26B friction linings, delimited by opposing friction faces, intended respectively to cooperate with a pressure plate and a reaction plate (not shown) rotationally fixed to an engine flywheel (not shown) of the motor vehicle.

The first 24A and second 24B friction lining members also comprise respectively first 28A and second 28B supports for the friction linings 26A and 26B.

These first 28A and second 28B supports are substantially annular, coaxial and separated axially from each other.

In general, these first 28A and second 28B supports are made from a composite material or steel preferably comprising 0.68% or 0.75% carbon (designated respectively XC68 and XC75 according to the French AFNOR standard).

The first 28A and second 28B supports each comprise a radially internal part 30A and respectively 30B, rotationally fixed to the guide washers 18, and a radially external part 32A and respectively 32B to which the first 26A and respectively second 26B friction linings are fixed, for example by adhesive bonding. In a variant, at least one friction lining and one support can be formed in one and the same piece, for example injection molded.

The radially internal parts 30A and respectively 30B delimit an internal contour 33A and respectively 33B of the first 24A and respectively second 24B friction lining members. The radially external parts 32A and respectively 32B delimit an external contour 34A and respectively 34B on the first 24A and respectively second 24B friction lining members.

The first support 28A has been depicted in more detail in FIG. 3. It should be noted that, in accordance with the embodiment depicted, the first 28A and second 28B supports are similar.

The first support 28A comprises elastic connecting tongues 35A, each provided with a first end 36A for connection with the radially external part 32A and a second end 38A for connection with the radially internal part 30A In the embodiment described, the connecting tongues 35A are made in one piece with the radially internal 30A and external 32A parts. Generally the connecting tongues 35A are obtained by cutting windows 40A in the support 28A between the radially internal 30A and external 32A parts, the connecting tongues 35A then delimiting the windows 40A.

As depicted in FIG. 1, the connecting tongues 35A of the first support 28A are folded so that their first 36A and second 38A connecting ends are offset axially from each other.

Thus, as depicted in FIGS. 1-3, the first 36A and second 38A connecting ends of each connecting tongue 35A have an angular (i.e., circumferential) offset between them with respect to a plane perpendicular to the rotation axis 11 (i.e., in a circumferential direction C around the rotation axis 11) that is variable according to the axial separation of the two friction lining members 24A, 24B. Generally the distance between the first 36A and second 38A connecting ends of each connecting tongue 35A in the circumferential direction around the rotation axis 11 is between 5 and 60 mm, preferably between 20 and 40 mm.

It should be noted that the connecting tongues 35A also form a swivel connection allowing an offset in alignment of the axes between on the one hand the first 28A and the second 28B supports and on the other hand the hub 16. Thus the friction linings 26A, 26B remain substantially parallel even when there is such an offset.

The friction device 10 also comprises means 42 of fixing the support 28A to the guide washers 18. These fixing means 42 comprise at least one fixing orifice 44A formed in the radially internally part 30A, for example three angularly distributed orifices 44A. These orifices 44A are intended to receive respective complementary fixing members 46, for example conventional fixing rivets 46, also intended to fix the guide washers 18 to each other.

The second support 28B is similar to the first support 28A. It also comprises radially internal 30B and external 32B parts, connected together by connecting tongues 35B. However, in the example depicted the connecting tongues 35B of the second support 28B are not folded, unlike the connecting tongues 35A of the first support 28A.

It should be noted however that the presence of these connecting tongues 35B is preferable, in order also to form a swivel connection. In this way the parallelism of the friction linings 26A, 26B is ensured more effectively.

The second support 28B also comprises, on its radially internal part 30B, orifices 44B for fixing this support 28B to the guide washers 18, for example three orifices 44B formed in the radially internal part 30B and distributed angularly, opposite the orifices 44A.

By virtue of the connection means 42, the radially internal parts 30A, 30B of the supports 28A, 28B are integral and the radially external parts 32A, 32B, carrying the friction linings, are able to move axially parallel to each other by screwing along their axis.

The friction disc 12 also comprises an elastic means 47 of axial bracing of the first 28A and second 28B supports, intended to ensure the progressiveness of the clutch. In accordance with the embodiment described the elastic axial bracing means 47 comprise an elastomer mass 48 preferably comprising three generally annular shaped beads, substantially coaxial, arranged between the first 28A and second 28B supports.

It should be noted that the elastic axial bracing means 47 also comprise connecting tongues 35A, 35B. This is because the elasticity of these connecting tongues 35A, 35B participates in the progressiveness of the clutch.

Figure 5:
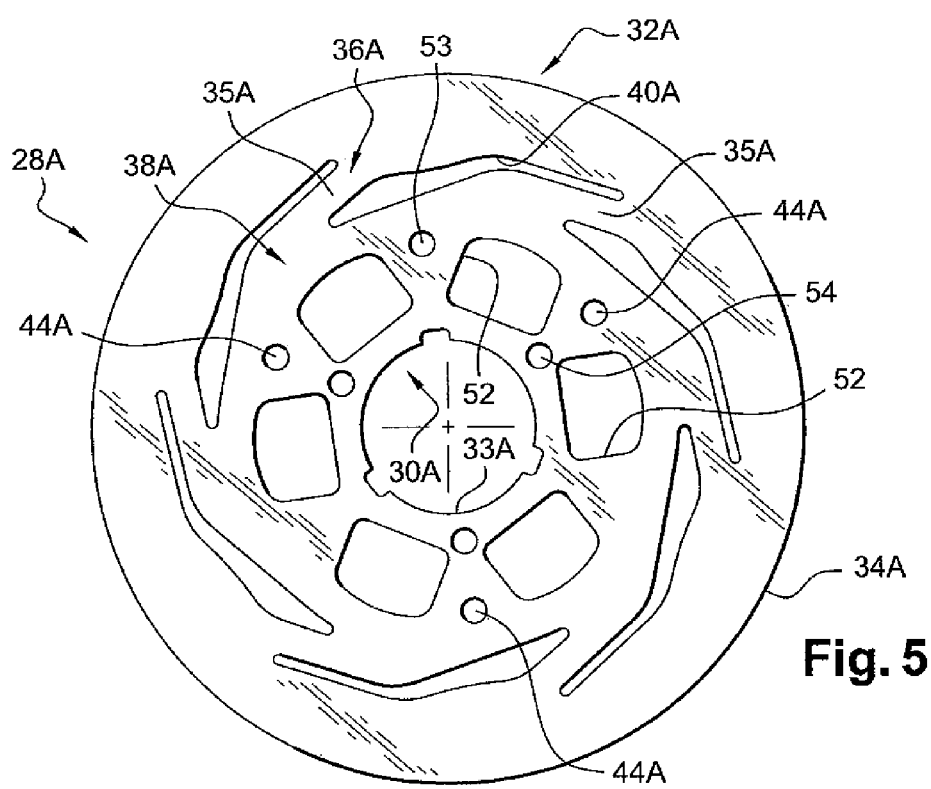
FIG. 5 is a view similar to FIG. 3 of the support of the friction device of FIG. 4.
Figure 4:
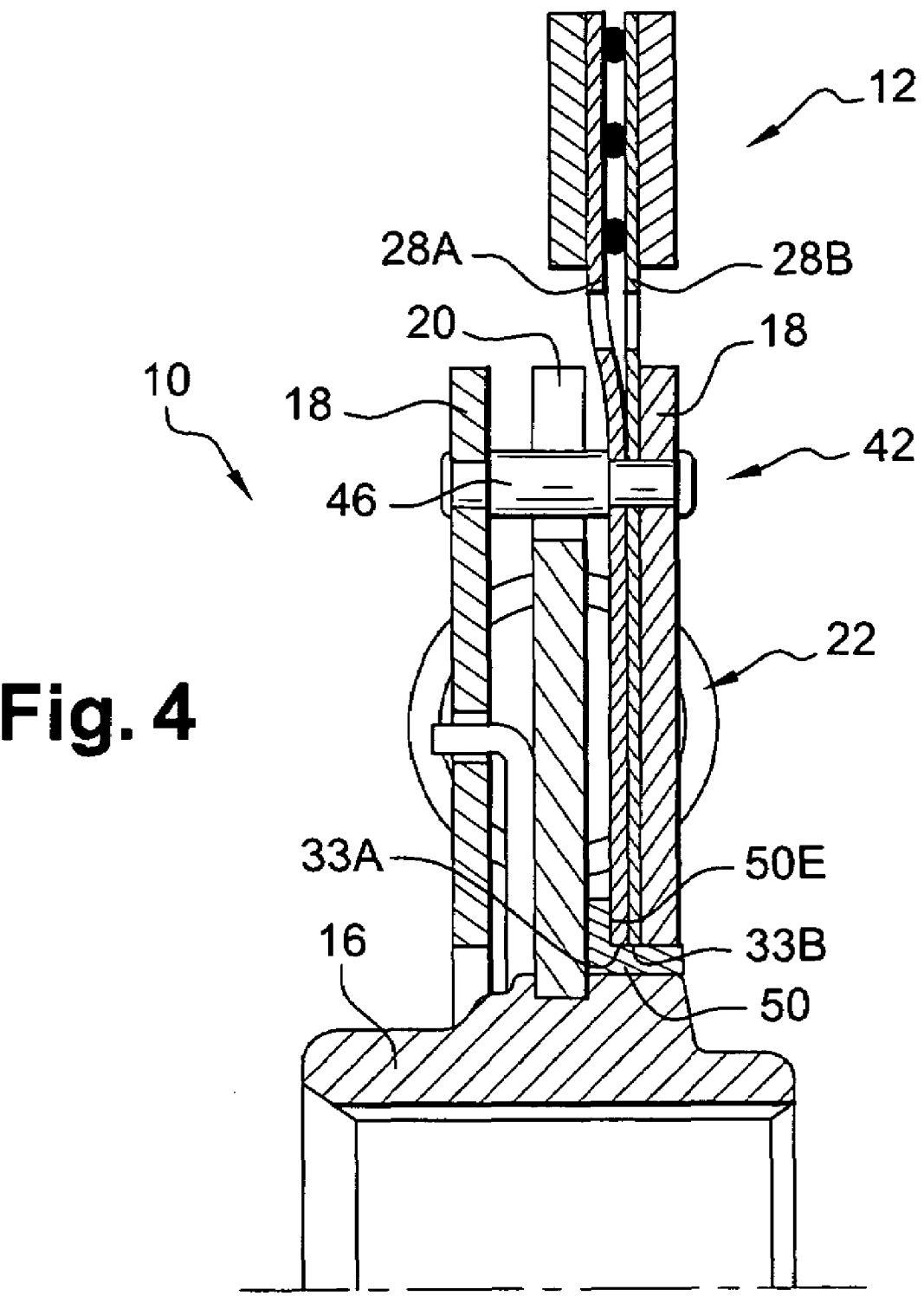
FIG. 4 is a view in axial section of the friction device according to the invention showing a variant embodiment of a support for a friction lining of this friction device.

FIGS. 4 and 5 depict a friction device according to a variant embodiment of the invention. In these FIGS. 4 and 5, the elements analogous to those in the previous figures are designated by identical references.

In accordance with this variant embodiment, the radially internal parts 30A, 30B of the first 28A and second 28B supports extend radially as far as a friction bearing 50 surrounding the hub 16 and rotationally fixed to the guide washers 18.

Thus the respective internal contours 33A, 33B of the first 28A and second 28B supports cooperate with this bearing 50 so as to participate firstly with the centering of the first 28A and second 28B supports with respect to the hub 16 and secondly in the axial positioning of this bearing 50 by cooperation with a shoulder 50E on this bearing 50.

It should be noted that the radially internal parts 30A, 30B comprise windows 52 intended to leave a passage for the elastic means 22.

The radial internal parts 30A, 30B preferably each comprise a centering orifice 53 provided on the same radius as the fixing orifices 44A, 44B. This centering orifice 53 participates in the centering of the corresponding support 28A, 28B with respect to the guide washers, for example by the passing of a rod (not shown) through this orifice 53 and corresponding orifices provided on the guide washers.

Preferably also, the radially internal parts 30A, 30B comprise orifices 54 that are radially internal with respect to the fixing orifices 44A, 44B. In accordance with a variant embodiment, not shown, these orifices 54 can receive lugs of a damping washer for the elastic means 22, in order to rotationally fix this friction washer to the supports 28A, 28B, and therefore to the guide washers 18.

It should be noted that, in all the embodiments described above, it is possible to decouple the number of connecting tongues from that of the number of orifices for fixing to the guide washer. This is because, in the configuration of certain friction discs, the number of fixing orifices is limited. However, in order to be able to pass the torque, a minimum number of tongues is necessary, a minimum number that may then be greater than that of the fixing orifices.

Finally, it should be noted that the invention is not limited to the embodiment described above.

The friction device according to the invention can in fact comprise various variants without for all that departing from the scope of the invention.

For example, in order to make the support/lining connection flexible, it is possible to provide slots opening out on the outside diameter of the support (in a variant embodiment these slots are substantially radial). This will reduce the bimetallic effect between the two components, during thermal stresses, due to the fact that they generally have different coefficients of expansion.

In general terms, the design of the supports, outside the areas where the connecting tongues are situated, may be of almost any type provided that it keeps a sufficient support surface for the silicone beads and that this does not affect the ability to pass the torque. Perforations or slots can also serve to limit the inertia of the system.

The invention claimed is:

1. A friction device (10) for a clutch for a motor vehicle, comprising first (24A) and second (24B) friction lining members, substantially annular and coaxial with a rotation axis (11) of the friction device (10), separated axially and delimited by opposing friction faces, wherein the first friction lining member (24A) comprises:
   a first friction lining (26A); and
   a substantially annular first support (28A) including:
      a radially external part (32A) fixed to the first friction lining (26A);
      a radially internal part (30A) connected to the second friction lining member (24B); and
      elastic connecting tongues (35A) each provided with a first end (36A) for connection with the radially external part (32A) and a second end for connection with the radially internal part (30A), the first (36A) and second (38A) connecting ends being variably angularly offset from each other with respect to a plane perpendicular to the rotation axis according to the axial separation of the first and second friction lining members (24A, 24B).

2. The friction device (10) according to claim 1, wherein the connecting tongues (35A) are folded so that the first (36A) and second (38A) connecting ends are offset axially from each other.

3. The friction device (10) according to claim 1, wherein each connecting tongue (35A) is made in one piece with the radially internal (30A) and external (32A) parts.

4. The friction device (10) according to claim 1, further comprising means (42) of connecting the radially internal part (30A) with the second friction lining member (24B), comprising at least one fixing orifice (44A) formed in the radially internal part (30A).

5. The friction device (10) according to claim 4, wherein the connecting means (42) comprise at least one connecting orifice (44B) formed in the second friction lining member (24B), opposite the orifice (44A) formed in the radially internal part (30A), and a connecting rivet (46) passing though the connecting orifices (44A, 44B).

6. The friction device (10) according to claim 4, wherein the connecting means (42) are also intended to couple the radially internal part (30A) with a hub (16) coaxial with the radially internal part (30A).

7. The friction device (10) according to claim 1, further comprising elastic means (47) for axial bracing of the first (24A) and second (24B) friction lining members, intended to ensure the progressiveness of the clutch.

8. The friction device (10) according to claim 7, wherein the elastic means (47) comprise an elastomeric mass (48) including generally annular shaped beads, substantially coaxially arranged between the first and second friction lining members (24A, 24B).

9. The friction device 10 according to claim 1, wherein the radially internal part (30A) of the first friction lining member (24A) extends radially as far as a friction bearing (50) surrounding a hub (16) and free to rotate with respect to the hub (16), so as to participate on one hand in the centering of the first support (28A) with respect to the hub (16) and on the other hand in the axial positioning of this bearing (50) by cooperation with a shoulder (50E) on this bearing (50).

10. The friction device (10) according to claim 1, wherein the second friction lining member (24B) comprises:
- a second friction lining (26B); and
- a substantially annular second support (28B) including:
  - a radially external part (32B) fixed to the second friction lining (26B);
  - a radially internal part (30B) connected to the first friction lining member (24A); and
  - elastic connecting tongues (35B) each provided with a first end for connection with the radially external part (32B) and a second end for connection with the radially internal part (30B), the first and second connecting ends being variably angularly offset from each other with respect to a plane perpendicular to the rotation axis according to the axial separation of the first and second friction lining members.

11. The friction device (10) according to claim 1, wherein the first (36A) and second (38A) connecting ends are variably radially offset from each other according to the axial separation of the first and second friction lining members (24A, 24B).

* * * * *